United States Patent
Chatterji et al.

(10) Patent No.: US 7,004,254 B1
(45) Date of Patent: Feb. 28, 2006

(54) SUBTERRANEAN TREATMENT FLUIDS, FRICTION REDUCING COPOLYMERS, AND ASSOCIATED METHODS

(75) Inventors: Jiten Chatterji, Duncan, OK (US); Karen L. King, Duncan, OK (US); David E. McMechan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/156,356

(22) Filed: Jun. 17, 2005

(51) Int. Cl.
*E21B 43/27* (2006.01)

(52) U.S. Cl. .................. 166/279; 166/300; 166/308.2; 507/225; 507/226

(58) Field of Classification Search ................ 166/279, 166/300, 308.2, 307; 507/120, 121, 225, 507/226
See application file for complete search history.

(56) References Cited

U.S. PATENT DOCUMENTS

| | | | |
|---|---|---|---|
| 3,442,803 A | 5/1969 | Hoover et al. ............ 252/8.44 |
| 3,562,226 A | 2/1971 | Gayley et al. ............ 260/80.3 |
| 3,768,565 A | 10/1973 | Persinski et al. ........... 166/308 |
| 4,500,437 A * | 2/1985 | Engelhardt et al. ......... 507/225 |
| 4,694,046 A | 9/1987 | Bock et al. .............. 525/329.4 |
| 5,065,822 A * | 11/1991 | Miller et al. ................ 166/295 |
| 6,169,058 B1 * | 1/2001 | Le et al. ..................... 507/222 |
| 6,454,008 B1 * | 9/2002 | Chatterji et al. ......... 166/308.6 |
| 6,784,141 B1 | 8/2004 | King et al. ................. 507/555 |

\* cited by examiner

*Primary Examiner*—Zakiya W. Bates
(74) *Attorney, Agent, or Firm*—Robert A. Kent; Baker Botts

(57) ABSTRACT

Aqueous treatment fluids that comprise water, and a friction reducing copolymer that comprises acrylamide in an amount in the range of from about 60% to about 90% by weight and acrylic acid in an amount in the range of from about 10% to about 20% by weight. Methods of treating portions of subterranean formation using the aqueous treatment fluid that comprise providing an aqueous treatment fluid comprising water, and a friction reducing copolymer that comprises acrylamide in an amount in the range of from about 60% to about 90% by weight and acrylic acid in an amount in the range of from about 10% to about 20% by weight; and introducing the aqueous treatment fluid into the portion of the subterranean formation.

20 Claims, No Drawings

SUBTERRANEAN TREATMENT FLUIDS, FRICTION REDUCING COPOLYMERS, AND ASSOCIATED METHODS

BACKGROUND

The present invention relates to subterranean treatments, and more particularly, to aqueous subterranean treatment fluids that comprise friction reducing copolymers and associated methods.

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

An example of a stimulation operation utilizing an aqueous treatment fluid is hydraulic fracturing. In some instances, a fracturing treatment involves pumping a proppant-free, aqueous treatment fluid (known as a pad fluid) into a subterranean formation faster than the fluid can escape into the formation so that the pressure in the formation rises and the formation breaks, creating or enhancing one or more fractures. Enhancing a fracture includes enlarging a pre-existing fracture in the formation. Once the fracture is formed or enhanced, proppant particulates are generally placed into the fracture to form a proppant pack that may prevent the fracture from closing when the hydraulic pressure is released, forming conductive channels through which fluids may flow to the well bore.

During the pumping of the aqueous treatment fluid into the well bore, a considerable amount of energy may be lost due to friction between the aqueous treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The friction reducing polymer should reduce the frictional losses due to friction between the aqueous treatment fluid in turbulent flow and the tubular goods and/or the formation.

In some instances, the friction reducing polymers that have been used previously are suspended in oil-external emulsions, wherein upon addition to the aqueous treatment fluid, the emulsion should invert releasing the friction reducing polymer into the fluid. One such friction reducing polymer is a copolymer of acrylic acid (in an amount of 30% by weight) and acrylamide (in an amount of 70% by weight). However, it is believed that the ionic nature of certain of these friction reducing polymers (such as the aforementioned copolymer) may cause the friction reducing polymers to function as flocculants. This may be undesirable, for example, in fracturing treatments in that the interaction of the friction reducing polymer with formation fines may result in the coagulation of formation fines into flocs. The resulting flocs may be undesirable, among other things, because the flocs may facilitate the formation of a stable emulsion in the formation possibly undesirably impacting subsequent production from the well bore.

SUMMARY

The present invention relates to subterranean treatments, and more particularly, to aqueous subterranean treatment fluids that comprise friction reducing copolymers and associated methods.

An embodiment of the present invention provides a method of treating a portion of a subterranean formation. An example of such a method may comprise: providing an aqueous treatment fluid of the present invention comprising water, and a friction reducing copolymer of the present invention that comprises acrylamide in an amount in the range of from about 60% to about 90% by weight and acrylic acid in an amount in the range of from about 10% to about 20% by weight; and introducing the aqueous treatment fluid into the portion of the subterranean formation.

Another embodiment of the present invention provides an aqueous treatment fluid of the present invention that comprises water and a friction reducing copolymer of the present invention that comprises acrylamide in an amount in the range of from about 60% to about 90% by weight and acrylic acid in an amount in the range of from about 10% to about 20% by weight.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean treatments, and more particularly, to aqueous subterranean treatment fluids that comprise friction reducing copolymers and associated methods.

I. Aqueous Treatment Fluids of the Present Invention

The aqueous treatment fluids of the present invention generally comprise water, and a friction reducing copolymer of the present invention that comprises acrylamide in an amount in the range of from about 60% to about 90% by weight and acrylic acid in an amount in the range of from about 10% to about 20% by weight. The term "friction reducing copolymer," as used herein, refers to a copolymer that reduces frictional losses due to friction between an aqueous treatment fluid in turbulent flow and tubular goods (e.g. pipes, coiled tubing, etc.) and/or the formation. The term "copolymer," as used herein, is not limited to polymers comprising two types of monomeric units, but includes any combination of polymers, e.g., terpolymers, tetrapolymers, and the like.

Generally, a friction reducing copolymer of the present invention may be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

The water used in the aqueous treatment fluids of the present invention may be freshwater, saltwater (e.g., water containing one or more salts dissolved therein), brine (e.g., produced from subterranean formations), or seawater, or combinations thereof. Generally, the water used may be from any source, provided that it does not contain an excess of compounds that may adversely affect other components in the aqueous treatment fluid or the formation itself. For example, it is believed that high salt concentrations (e.g., saturated salt solutions) may undesirably interact with the friction reducing copolymers of the present invention.

The friction reducing copolymers of the present invention comprise acrylamide in an amount in the range of from about 60% to about 90% by weight and acrylic acid in an amount in the range of from about 10% to about 20% by weight. Among other things, the friction reducing copolymers of the present invention should reduce energy losses due to friction in the aqueous treatment fluids of the present invention. For example, the friction reducing copolymers of the present invention may reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore. Further, due to reduced acrylic acid content as compared to copolymers used previously for friction reduction, the friction reducing copolymers of the present invention should have a reduced ionic nature, minimizing the flocculation properties thereof.

The friction reducing copolymers of the present invention should be included in the aqueous treatment fluids of the present invention in an amount sufficient to provide the desired reduction of friction. In some embodiments, a friction reducing copolymer of the present invention may be present in an amount in the range of from about 0.01% to about 4% by weight of the aqueous treatment fluid. In some embodiments, a friction reducing copolymer of the present invention may be present in an amount in the range of from about 0.025% to about 0.1% by weight of the aqueous treatment fluid.

The amount of acrylamide and acrylic acid to include in the friction reducing copolymers of the present invention may be determined based on a number of factors, including the desired friction reduction, flocculation properties, etc. Generally, the acrylamide should be present in the friction reducing copolymer in an amount in the range of from about 60% to about 90% by weight of the copolymer, and the acrylic acid should be present in the friction reducing copolymer in an amount in the range of from about 10% to about 20% by weight of the copolymer. In certain embodiments, the acrylamide may be present in an amount in the range of from about 80% to about 90% by weight of the copolymer. In certain embodiments, the acrylic acid may be present in an amount in the range of from about 12% to about 17.5% by weight of the copolymer. In one embodiment, the acrylamide may be present in an amount of about 85% by weight of the copolymer, and the acrylic acid may be present in an amount of about 15% by weight of the copolymer.

Optionally, the friction reducing copolymers of the present invention may further comprise other monomers in addition to acrylamide and acrylic acid. For example, in some embodiments, the friction reducing copolymers may comprise 2-acrylamido-2-methylpropane sulfonic acid, N,N-dimethylacrylamide, vinyl sulfonic acid, N-vinyl acetamide, N-vinyl formamide, and mixtures thereof.

In certain embodiments, 2-acrylamido-2-methylpropane sulfonic acid may be present in the friction reducing copolymers of the present invention in an amount in the range of from about 0.1% to about 30% by weight of the copolymer. An example of a suitable friction reducing copolymer may comprise acrylamide in an amount in the range of from about 70% to about 85% by weight of the copolymer, acrylic acid in an amount in the range of from about 10% to about 12.5% by weight of the copolymer, and 2-acrylamido-2-methylpropane sulfonic acid in an amount in the range of from about 2.5% to about 20% by weight of the copolymer.

In certain embodiments, N,N-dimethylacrylamide may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 80% by weight of the copolymer, acrylic acid in an amount in the range of from about 10% to about 12.5% by weight of the copolymer, 2-acrylamido-2-methylpropane sulfonic acid in an amount in the range of from about 7.5% to about 20% by weight of the copolymer, and N,N-dimethylacrylamide in an amount in the range of from about 2.5% to about 10% by weight of the copolymer.

In some embodiments, vinyl sulfonic acid may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, 2-acrylamido-2-methylpropane sulfonic acid in an amount in the range of from about 0.1% to about 25% by weight of the copolymer, and vinyl sulfonic acid in an amount in the range of from about 0.1% to about 5% by weight of the copolymer.

In some embodiments, N-vinyl acetamide may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, 2-acrylamido-2-methylpropane sulfonic acid in an amount in the range of from about 0.1% to about 25% by weight of the copolymer, and N-vinyl acetamide in an amount in the range of from about 0.1% to about 5% by weight of the copolymer.

In some embodiments, N-vinyl formamide may be present in the friction reducing copolymers of the present invention in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, 2-acrylamido-2-methylpropane sulfonic acid in an amount in the range of from about 0.1% to about 25% by weight of the copolymer, and N-vinyl formamide in an amount in the range of from about 0.1% to about 5% by weight of the copolymer.

The friction reducing copolymers of the present invention should have a molecular weight sufficient to provide a desired level of friction reduction. Generally, friction reducing copolymers having higher molecular weights may be needed to provide a desirable level of friction reduction. For example, in some embodiments, the weight average molecular weight of the friction reducing copolymers may be in the range of from about 7,500,000 to about 20,000,000, as determined using intrinsic viscosities. Those of ordinary skill in the art will recognize that friction reducing copolymers having molecular weights outside the listed range may still provide some degree of friction reduction in an aqueous treatment fluid.

Suitable friction reducing copolymers of the present invention may be in an acid form or in a salt form. A variety of salts may be made by neutralizing the acid form of the acrylic acid monomer and/or the 2-acrylamido-2-methylpropane sulfonic acid monomer with a base, such as sodium hydroxide, ammonium hydroxide or the like. As used herein, the term "copolymer" is intended to include both the acid form of the friction reducing copolymer and its various salts.

The friction reducing copolymers suitable for use in the present invention may be made in accordance with any of a variety of polymerization methods. In one embodiment, a suitable friction reducing copolymer may be prepared using emulsion polymerization. Those of ordinary skill in the art, with the benefit of this disclosure, will recognize an appropriate polymerization method to synthesize a suitable friction reducing copolymer. The present invention does not lie in the polymerization method used to synthesize the friction reducing copolymers of the present invention so long as it yields the desired friction reducing copolymer.

After polymerization, the friction reducing copolymers of the present invention may be provided in any suitable form, including in a solid form, suspended in an oil-external copolymer emulsion, or as a component of an aqueous solution. Suspension of the friction reducing copolymers in an oil-external copolymer emulsion will be described in more detail below.

Additional additives may be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

II. Oil-External Copolymer Emulsions

In embodiments where a particular friction reducing copolymer of the present invention is suspended in an oil-external copolymer emulsion, the oil-external copolymer emulsion may comprise water, a water-immiscible liquid, an emulsifier, and a friction reducing copolymer of the present invention. Suitable oil-external copolymer emulsions further may comprise inhibitors, salts, and inverters.

The water present in the oil-external copolymer emulsions generally includes freshwater, but saltwater or combinations with saltwater also may be used. Generally, the water used may be from any source, provided that it does not contain an excess of compounds that may adversely affect other components in the oil-external copolymer emulsion. In some embodiments, the water may be present in the oil-external copolymer emulsion in an amount in the range of from about 35% to about 50% by weight of the emulsion.

Suitable water-immiscible liquids may include, but are not limited to, water-immiscible solvents, such as paraffin hydrocarbons, napthene hydrocarbons, aromatic hydrocarbons, and mixtures thereof. The paraffin hydrocarbons may be saturated, linear, or branched paraffin hydrocarbons. Examples of suitable aromatic hydrocarbons include, but are not limited to, toluene and xylene. An example of a suitable water-immiscible solvent comprising paraffin hydrocarbons and napthene hydrocarbons is "LPA®-210", available from Sasol North America, Inc., Houston, Tex. The water-immiscible liquid may be present in the oil-external copolymer emulsion in an amount sufficient to form a stable emulsion. In some embodiments, the water-immiscible liquid may be present in the oil-external copolymer emulsions in an amount in the range of from about 20% to about 30% by weight.

Emulsifiers should be present in the oil-external copolymer emulsion, among other things, to lower the interfacial tension between the water and the water-immiscible liquid so as to facilitate the formation of an oil-external copolymer emulsion. Examples of suitable emulsifiers include, but are not limited to, ethoxylated nonionic surfactants, guerbet alcohol ethoxylate, and mixtures thereof. An example of a suitable emulsifier comprises a tall oil fatty acid diethanolamine, such as "AMADOL® 511", available from Akzo Nobel Surface Chemistry, Chicago, Ill. Another example of a suitable emulsifier comprises a polyoxyethylene (5) sorbitan monoolate, such as "TWEEN® 81," available from Uniqema, New Castle, Del. Another example of a suitable emulsifier comprises a sorbinate monoolate, such as "ALKAMULS® SMO," available from Rhone Poulenc, Inc., Paris, France. The emulsifier should be present in an amount sufficient to provide the desired stable oil-external copolymer emulsion. In some embodiments, the emulsifier may be present in an amount in the range of from about 0.5% to about 2.5% by weight of the emulsion.

The friction-reducing copolymers of the present invention that may be present in the oil-external copolymer emulsions are described above. The friction-reducing copolymer should be present in the oil-external copolymer emulsion in an amount that does not undesirably impact the emulsion's stability. In some embodiments, the friction-reducing copolymer may be present in an amount in the range of from about 30% to about 35% by weight of the emulsion.

In some embodiments, the oil-external copolymer emulsions further may comprise a salt. Among other things, the salt may be present, among other things, to add stability to the emulsion and/or reduce the viscosity of the emulsion. Examples of suitable salts, include, but are not limited to, ammonium chloride, potassium chloride, sodium chloride, ammonium sulfate, and mixtures thereof. In some embodiments, the salt may be present in the oil-external copolymer emulsions in an amount in the range of from about 0.5% to about 2.5% by weight of the emulsion.

In some embodiments, the oil-external copolymer emulsions further may comprise an inhibitor. Among other things, the inhibitor may be included to prevent premature polymerization of the monomers prior to initiation of the emulsion polymerization reaction. As those of ordinary skill in the art will appreciate, with the benefit of this disclosure, the copolymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

In some embodiments, the oil-external copolymer emulsions further may comprise an inverter. Among other things, the inverter may facilitate the inverting of the emulsion upon addition to the aqueous treatment fluids of the present invention. As those of ordinary skill in the art will appreciate, with the benefit of this disclosure, upon addition to the aqueous treatment fluid, the emulsion should invert, releasing the copolymer into the aqueous treatment fluid. Examples of suitable inverters include, but are not limited to, ethoxylated alcohols, nonionic surfactant with an HLB of from 12 to 14, and mixtures thereof. An example of a suitable inverter comprises an ethoxylated C12–C16 alcohol, such as "SURFONIC® L24-7," available from Huntsman Performance Products, The Woodlands, Tex. The inverter should be present in an amount sufficient to provide the desired inversion of the emulsion upon contact with the water in the aqueous treatment fluid. In some embodiments, the inhibitor may be present in an amount in the range of from about 1% to about 5% by weight of the emulsion.

In one embodiment, a suitable oil-external copolymer emulsion may comprise: a water-immiscible organic solvent in an amount of about 21.1732% by weight that comprises paraffin hydrocarbons and napthene hydrocarbons; a tall oil fatty acid diethanolamine in an amount of about 1.1209% by weight; a polyoxyethylene (5) sorbitan monooleate in an amount of about 0.0722% by weight; a sorbitan monooleate in an amount of about 0.3014% by weight; a friction reducing copolymer in an amount of about 31.1392% by weight that comprises acrylamide in an amount of about 85% by weight of the copolymer and acrylic acid in an amount of about 15% by weight of the copolymer; 4-methoxyphenol in an amount of about 0.0303% by weight; ammonium chloride in an amount of about 1.6191% by weight; an ethoxylated C12–C16 alcohol in an amount of about 1.37% by weight; and water in an amount of about 43.1737% by weight.

In some embodiments, emulsion polymerization may be used to prepare a suitable oil-external copolymer emulsion that comprises a friction reducing copolymer of the present invention. Suitable emulsion polymerization techniques may have a variety of different initiation temperatures depending on, among other things, the amount and type of initiator used, the amount and type of monomers used, the amount and type of inhibitor used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 37° C. to about 45° C.

A variety of different mixtures may be used to prepare an oil-external copolymer emulsion comprising a friction reducing copolymer of the present invention. Suitable mixtures may include acrylamide, acrylic acid, water, a water-immiscible liquid, an initiator, and an emulsifier. Optionally, the mixture further may comprise an inhibitor, a base (e.g., sodium hydroxide) to neutralize the acrylic acid forming the salt form of the friction reducing copolymer, a complexing agent to allow the gradual release of monomers in the polymerization reaction, an activator to initiate polymerization at a lower temperature, and an inverter. Those of ordinary skill in the art, with the benefit of this disclosure, will, know the amount and type of components to include in the mixture based on a variety of factors, including the desired molecular weight and composition of the friction reducing copolymer and the desired initiation temperature. An example of a mixture that may be used to form a suitable oil-external copolymer emulsion is shown in Table 1 below.

TABLE 1

| Component | Concentration (% by weight) |
| --- | --- |
| Paraffinic/Napthenic Organic Solvent | 21.1732 |
| Tall Oil Fatty Acid Diethanolamine | 1.1209 |
| Polyoxyethylene (5) Sorbitan Monooleate | 0.0722 |
| Sorbitan Monooleate | 0.3014 |
| Acrylamide | 22.2248 |
| 4-Methoxyphenol | 0.0303 |
| Ammonium Chloride | 1.6191 |
| Acrylic Acid | 4.3343 |
| Ethylenediamine Tetracetic Acid | 0.0237 |
| t-Butyl Hydroperoxide | 0.0023 |
| Sodium Metabisulfite | 0.2936 |
| 2,2'-azobis(2-amidinopropane)dihydrochloride | 0.0311 |
| Ethoxylated C12–C16 alcohol | 1.3700 |
| Water | 43.1737 |
| Total | 100.0 |

III. Methods of the Present Invention

The aqueous treatment fluids of the present invention may be used in any subterranean treatment where the reduction of friction is desired. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In some embodiments, the present invention provides a method of treating a portion of a subterranean formation, comprising: providing an aqueous treatment fluid of the present invention comprising water and a friction reducing copolymer of the present invention that comprises acrylamide in an amount in the range of from about 60% to about 90% by weight and acrylic acid in an amount in the range of from about 10% to about 20% by weight; and introducing the aqueous treatment fluid into the portion of the subterranean formation. In some embodiments, the aqueous treatment fluid may be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present invention further may comprise preparing the aqueous treatment fluid. Preparing the aqueous treatment fluid may comprise providing the friction reducing copolymer and combining the friction reducing copolymer with the water to from the aqueous treatment fluid. The friction reducing copolymer may be provided in a solid form, suspended in an oil-external copolymer emulsion, or as a component of an aqueous solution. For example, in certain embodiments, providing the friction reducing copolymer may comprising providing an oil-external copolymer emulsion that comprises additional water, a water-immiscible liquid, an emulsifier, and the friction reducing copolymer.

To facilitate a better understanding of the present invention, the following examples of certain aspects of some embodiments are given. In no way should the following examples be read to limit, or define, the scope of the invention.

EXAMPLES

Friction reduction tests were performed using friction reducing copolymers comprised of varying concentrations of acrylamide and acrylic acid. The friction reducing copolymers that were tested had acrylamide/acrylic acid concentrations of 70/30, 85/15, 87.5/12.5, and 90/10, as shown in Table 3 below. For this series of tests, the friction reducing copolymers were provided in oil-external copolymer emulsions. The exact concentration of components in the oil-external copolymer emulsions used in this example varied depending, among other things, on the friction reducing copolymer used. The composition of the oil-external copolymer emulsion that comprised a friction reducing copolymer having an acrylamide to acrylic acid weight ratio of 85/15 is shown in Table 2 below.

TABLE 2

| Component | % by weight |
| --- | --- |
| Paraffinic/Napthenic Organic Solvent | 21.1732 |
| Tall Oil Fatty Acid Diethanolamine | 1.1209 |
| Polyoxyethylene (5) Sorbitan Monooleate | 0.0722 |
| Sorbitan Monooleate | 0.3014 |
| Copolymer comprising acrylamide and acrylic acid sodium salt | 31.1392 |
| 4-Methoxyphenol | 0.0303 |
| Ammonium Chloride | 1.6191 |
| ethoxylated C12–C16 alcohol | 1.3700 |
| Water | 43.1737 |
| Total | 100.0 |

These friction reduction tests were performed in accordance with the procedure listed below. For each friction reducing copolymer, a portion of the oil-external copolymer emulsion was added to freshwater in an amount of about 0.5 gallons per 1,000 gallons and tested for friction pressure reduction using a Friction Reduction Meter ("FR Meter"). The FR Meter was a closed loop pipeline apparatus designed to measure the pressure drop across a 5-foot section of a 12-foot commercial steel pipe. The commercial steel pipe had an inner diameter of 0.632 inches with a wall roughness of 0.00011 feet. The FR Meter consisted of a storage/mixing tank connected to a fixed speed progressive cavity pump which pumped the test fluid through a magnetic flow meter then through the test pipes and a return line to the storage/mixing tank. For each test, about 10 liters of freshwater were added to the storage/mixing tank. Next, the pump was run to circulate the freshwater for an amount of time sufficient to fill all the pipes with water. Once the pipes were filled with water, the pump was stopped. The data acquisition system was started, and the pump was started after about an additional 10 to 15 seconds. The data acquisition system measured the flow rate, tank temperature, and pressure drop across the 5-foot section of pipe. At about 1 minute into the test the desired quantity of the oil-external copolymer emulsion that comprised a friction reducing copolymer was added to the storage/mixing tank. Each test was run for a total of about 20 minutes, with flow rate, tank temperature, and pressure drop across the 5-foot section of pipe recorded at one-second intervals. The pump rate was about 30 liters per minute, or 3 system volumes per minute. For the commercial steel pipe, the flow was fully turbulent at a Reynolds Number of about 50,000.

The first minute of data that was collected prior to the addition of the oil-external copolymer emulsion was used to verify instrument readings and provide a baseline of data with a known fluid. The pressure drop across the 5-foot section of pipe for the freshwater, was calculated from the flow rate and pipe dimensions in accordance with the following formula:

$$\Delta P_{water} = \frac{\rho V^2 L f}{2 g_c D_h}$$

wherein $\Delta P_{water}$ is the calculated pressure drop for the water, $\rho$ is density, $V$ is the velocity, $L$ is length, $g_c$ is the gravitational constant, and $D_h$ is the pipe diameter. The variable f was calculated in accordance with the formula below for turbulent flow.

$$f = \left\{ -2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2}$$

wherein $\varepsilon$ is pipe roughness, d is the pipe diameter, and $N_{Re}$ is the Reynold's Number (Shacham, M., *Isr. Chem. Eng.*, 8, 7E (1976)).

Following the addition of the oil-external copolymer emulsion to the tank, the measured pressure drop, was compared to the calculated pressure drop for the water to determine the % Friction Reduction ("% FR") using the following equation:

$$\%FR = 1 - \frac{\Delta P_{measured}}{\Delta P_{water}}$$

wherein $\Delta P_{water}$ is the calculated pressure drop for the water and $\Delta P_{measured}$ is the measured pressure drop after introduction of the oil-external copolymer emulsion.

The results of this series of test are shown in Table 3 below.

TABLE 3

| | Ratio of Acrylamide/Acrylic Acid | | | |
| --- | --- | --- | --- | --- |
| Measured Parameter | 70/30 | 85/15 | 87.5/12.5 | 90/10 |
| % FR at 4 min. | 65.9 | 66.3 | 62.2 | 57.2 |
| % FR at 9 min. | 61.0 | 56.1 | 54.3 | 50.2 |
| % FR at 14 min. | 55.2 | 49.8 | 50.3 | 45.2 |
| % FR at 19 min. | 50.0 | 45.8 | 45.7 | 41.3 |
| Maximum % FR | 69.7 | 71.1 | 70.7 | 69.7 |
| $\Delta P_{measured}$ Sum at 2 min | 92 | 80 | 80 | 88 |
| $\Delta P_{measured}$ Sum at 5 min | 208 | 194 | 192 | 222 |
| $\Delta P_{measured}$ Sum at 10 min | 424 | 435 | 428 | 509 |

The maximum friction reduction and percent friction reduction at various times may be used to compare the relative performance of the various friction reducing copolymers. The sum of the measured pressure drops may also be used to compare the performance of the various friction reducing copolymers. A lower sum should represent better friction reduction. The start time for these measurements was when the oil-external copolymer emulsion was added to the storage/mixing tank.

These examples thus shows that a friction reducing copolymer comprised of less than 30% acrylic acid may provide friction reduction comparable to, or better than, a friction reducing copolymer comprised of 30% acrylic acid.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of treating a portion of a subterranean formation, comprising:
   providing an aqueous treatment fluid comprising water, and a friction reducing copolymer consisting essentially of acrylamide in an amount in the range of from about 80% to about 90% by weight and acrylic acid in an amount in the range of from about 10% to about 20% by weight; and
   introducing the aqueous treatment fluid into the portion of the subterranean formation.

2. The method of claim 1 wherein the friction reducing copolymer is present in an amount in the range of from about 0.01% to about 4% by weight of the aqueous treatment fluid.

3. The method of claim 1 wherein the friction reducing copolymer has a molecular weight in the range of from about 7,500,000 to about 20,000,000.

4. The method of claim 1 wherein the acrylic acid is present in the friction reducing copolymer in an amount in the range of from about 12% to about 17% by weight of the friction reducing copolymer.

5. The method of claim 1 wherein the aqueous treatment fluid is introduced into the portion of the subterranean formation at a rate and pressure sufficient to create or enhance one or more fractures in the portion of the subterranean formation.

6. The method of claim 1 further comprising the step of preparing the aqueous treatment fluid, wherein the step of preparing the aqueous treatment fluid comprises:
   providing the friction reducing copolymer; and
   combining the friction reducing copolymer and the water to form the aqueous treatment fluid.

7. The method of claim 6 wherein the friction reducing copolymer is provided in a solid form, suspended in an oil-external copolymer emulsion, or as a component of an aqueous solution.

8. The method of claim 6 wherein the step of providing the friction reducing copolymer comprises providing an oil-external copolymer emulsion that comprises additional water, a water-immiscible liquid, an emulsifier, and the friction reducing copolymer.

9. The method of claim 8 wherein the oil-external copolymer emulsion inverts subsequent to combination with the water, releasing the friction reducing copolymer into the water with which the oil-external copolymer emulsion was combined.

10. The method of claim 8 wherein the oil-external copolymer emulsion further comprises at least one of the following: an inhibitor, a salt, or an inverter.

11. The method of claim 8:
    wherein the oil external copolymer emulsion further comprises ammonium salt, 4-methoxyphenol, and an ethoxylated C12–C16 alcohol; and
    wherein the water-miscible liquid comprises a mixture of paraffinnic hydrocarbons and napthenic hydrocarbons; and
    wherein the emulsifier comprises a tall oil fatty acid diethanol amine, a polyoxyethylene (5) sorbitan monooleate, and a sorbitan monooleate; and
    wherein the acrylamide is present in the friction reducing copolymer in an amount in the range of from about 80% to about 90% by weight of the copolymer.

12. The method of claim 1 wherein the friction reducing copolymer is present in the aqueous treatment fluid in an amount in the range of from about 0.025% to about 0.1% by weight of the aqueous treatment fluid.

13. A method of treating a portion of a subterranean formation, comprising:
    providing an oil-external copolymer emulsion that comprises water, a water-immiscible liquid, an emulsifier, and a friction reducing copolymer that comprises acrylamide in an amount in the range of from about 60% to about 90% by weight and acrylic acid in an amount in the range of from about 10% to about 20% by weight;
    combining the oil-external copolymer emulsion with additional water to form an aqueous treatment fluid;
    allowing the oil-external copolymer emulsion to invert so as to release the friction reducing copolymer into the aqueous treatment fluid, after the step of combining the oil-external copolymer emulsion with the additional water; and
    introducing the aqueous treatment fluid into the portion of the subterranean formation.

14. The method of claim 13 wherein the friction reducing copolymer is present in the aqueous treatment fluid an amount in the range of from about 0.025% to about 0.1% by weight of the aqueous treatment fluid.

15. The method of claim 13 wherein the friction reducing copolymer has a molecular weight in the range of from about 7,500,000 to about 20,000,000.

16. The method of claim 13 wherein the acrylamide is present in the friction reducing copolymer in an amount in the range of from about 80% to about 90%.

17. The method of claim 13 wherein the acrylic acid is present in the friction reducing copolymer in an amount in the range of from about 12% to about 17% by weight of the friction reducing copolymer.

18. The method of claim 13 wherein the friction reducing copolymer further comprises at least one of the following: 2-acrylamido-2-methylpropane sulfonic acid; N,N-dimethylacrylamide; vinyl sulfonic acid; N-vinyl acetamide; or N-vinyl formamide.

19. The method of claim 13:
    wherein the oil external copolymer emulsion further comprises ammonium salt, 4-methoxyphenol, and an ethoxylated C12–C16 alcohol; and
    wherein the water-miscible liquid comprises a mixture of paraffinnic hydrocarbons and napthenic hydrocarbons; and
    wherein the emulsifier comprises a tall oil fatty acid diethanol amine, a polyoxyethylene (5) sorbitan monooleate, and a sorbitan monooleate; and
    wherein the acrylamide is present in the friction reducing copolymer in an amount in the range of from about 80% to about 90% by weight of the copolymer.

20. The method of claim 13 wherein the aqueous treatment fluid is introduced into the portion of the subterranean formation at a rate and pressure sufficient to create or enhance one or more fractures in the portion of the subterranean formation.

* * * * *